(12) United States Patent
Miyamoto et al.

(10) Patent No.: US 9,167,110 B2
(45) Date of Patent: Oct. 20, 2015

(54) INPUT DEVICE CAPABLE OF CONVERTING CHARACTER STYLE OF INPUT CHARACTER, IMAGE FORMING APPARATUS HAVING THE INPUT DEVICE, AND ELECTRONIC APPARATUS HAVING THE INPUT DEVICE

(71) Applicant: KYOCERA Document Solutions Inc., Osaka (JP)

(72) Inventors: Keita Miyamoto, Osaka (JP); Ken Saratani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/489,771

(22) Filed: Sep. 18, 2014

(65) Prior Publication Data

US 2015/0085306 A1  Mar. 26, 2015

(30) Foreign Application Priority Data

Sep. 25, 2013  (JP) .................................. 2013-198752

(51) Int. Cl.
*G06K 15/02* (2006.01)
*H04N 1/00* (2006.01)
(Continued)

(52) U.S. Cl.
CPC ............ *H04N 1/00392* (2013.01); *G06F 3/018* (2013.01); *G06F 3/0416* (2013.01);
(Continued)

(58) Field of Classification Search
CPC ............... G06K 2209/01; G06K 9/342; G06F 17/30303; G06F 3/0233; G06F 3/0235; G06F 3/04883; G06F 17/2735; G06F 17/276; G06F 3/0237; G06F 3/038; G06F 3/0488; G06F 3/04886; G06F 9/541
USPC .......................... 358/1.11; 345/173; 382/181
See application file for complete search history.

(56) References Cited

U.S. PATENT DOCUMENTS

2008/0316212 A1* 12/2008 Kushler ........................ 345/467
2010/0293460 A1  11/2010 Budelli
(Continued)

FOREIGN PATENT DOCUMENTS

| EP | 2 458 493 A2 | 5/2012 |
| JP | 2001-014096 A | 1/2001 |
| WO | WO 2010/107653 A2 | 9/2010 |

OTHER PUBLICATIONS

The extended European search report issued by European Patent Office on Dec. 5, 2014 in the corresponding European patent application No. 14185790.4—8 pages.

*Primary Examiner* — Martin Mushambo
(74) *Attorney, Agent, or Firm* — Knobbe, Martens, Olson & Bear LLP (57) ABSTRACT

An input device includes: a receiving section configured to receive a plurality of characters input by a user's operation, a confirming section allowing the display control section to confirm the plurality of characters received by the receiving section; a display section configured to display the plurality of characters allowed to be confirmed by the confirming section; a touch sensor configured to detect a touch point on the display section; and a display control section configured to identify, based on the touch point detected by the touch sensor through a user's double tap, at least one conversion target character among the plurality of confirmed characters, convert a character style of the conversion target character, allow the display section to display the conversion target character converted in character style, confirm the input of the conversion target character converted in character style.

11 Claims, 8 Drawing Sheets

(51) Int. Cl.
  *G06F 3/041*   (2006.01)
  *G06F 3/0484*  (2013.01)
  *G06F 3/0488*  (2013.01)
  *G06F 17/24*   (2006.01)
  *G06F 3/01*    (2006.01)

(52) U.S. Cl.
  CPC ........ *G06F3/04842* (2013.01); *G06F 3/04883* (2013.01); *G06F 3/04886* (2013.01); *G06F 17/241* (2013.01); *H04N 1/0044* (2013.01); *H04N 1/00395* (2013.01); *H04N 1/00411* (2013.01); *G06F 2203/04808* (2013.01); *H04N 2201/0075* (2013.01); *H04N 2201/0094* (2013.01)

(56) References Cited

U.S. PATENT DOCUMENTS

2012/0327003 A1* 12/2012 Matsumura .................. 345/173
2013/0127703 A1   5/2013  Wendt

* cited by examiner

INPUT DEVICE CAPABLE OF CONVERTING CHARACTER STYLE OF INPUT CHARACTER, IMAGE FORMING APPARATUS HAVING THE INPUT DEVICE, AND ELECTRONIC APPARATUS HAVING THE INPUT DEVICE

INCORPORATION BY REFERENCE

This application claims priority to Japanese Patent Application No. 2013-198752 filed on Sep. 25, 2013, the entire contents of which are incorporated by reference herein.

BACKGROUND

The present disclosure relates to input devices, image forming apparatuses, and electronic apparatuses.

There is provided, as an input device mounted on a mobile information terminal or an image forming apparatus, an input device configured so that a text is input thereinto using a pen or a keyboard displayed on a display (for example, a software keyboard). As is often the case with such an input device, after confirming an edit of the text consisting of characters input through the input device, the user may find a literal error and correct it. In order to correct a confirmed character, the user needs to perform complicated operations, including a redisplay of the character, a deletion thereof, and a re-entry of a correct character.

For example, there is disclosed a pen input device which can reduce the complication of operations for correcting a character. With this pen input device, an editing process, such as a correction, insertion or deletion of a character input with a pen, can be performed in the same manner as in an input process.

SUMMARY

A technique improved over the aforementioned techniques is proposed as one aspect of the present disclosure.

An input device according to an aspect of the present disclosure includes a receiving section, a confirming section, a display section, a touch sensor, and a display control section.

The receiving section is configured to receive a plurality of characters input by an operation of a user.

The confirming section allows the plurality of characters received by the receiving section to be confirmed.

The display section is configured to display the plurality of characters allowed to be confirmed by the confirming section.

The touch sensor is configured to detect a touch point on the display section.

The display control section is configured to confirm the plurality of characters according to a confirmation signal received from the confirming section and allow the display section to display the plurality of confirmed characters.

The display control section is further configured to identify, based on the touch point detected by the touch sensor through a double tap of the user, at least one conversion target character from among the plurality of confirmed characters, convert a character style of the conversion target character, allow the display section to display the conversion target character in the converted character style, and confirm the conversion target character in the converted character style.

An image forming apparatus according to another aspect of the present disclosure includes the input device.

The input device includes the aforementioned receiving section, the aforementioned confirming section, the aforementioned display section, the aforementioned touch sensor, and the aforementioned display control section.

An electronic apparatus according to still another aspect of the present disclosure includes the input device.

The input device includes the aforementioned receiving section, the aforementioned confirming section, the aforementioned display section, the aforementioned touch sensor, and the aforementioned display control section.

DETAILED DESCRIPTION

Hereinafter, a description will be given of an input device, an image forming apparatus, and an electronic apparatus, each according to one embodiment of the present disclosure, with reference to the drawings. However, the present disclosure is not limited to the following embodiments. The same or equivalent parts are designated by the same reference characters in the following figures and a description thereof will not be repeated.

Embodiment 1

Basic Principle

Figure 1:
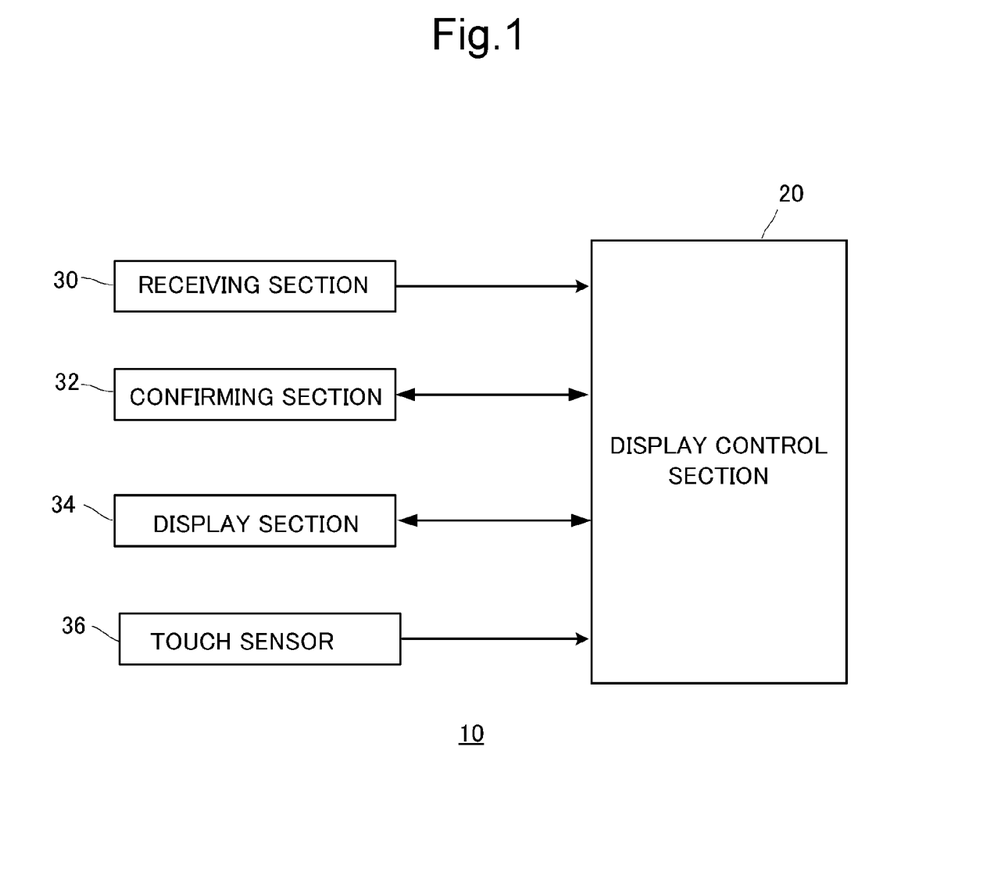
FIG. 1 is a block diagram showing an input device according to Embodiment 1 of the present disclosure.

With reference first to FIG. 1, a description will be given of a basic principle of an input device 10 according to Embodiment 1 of the present disclosure. FIG. 1 is a block diagram showing the input device 10 according to Embodiment 1 of the present disclosure. The input device 10 includes a receiving section 30, a confirming section 32, a display section 34, a touch sensor 36, and a display control section 20.

The input device 10 is mounted on, for example, a mobile information terminal (such as a smartphone) or an image forming apparatus (such as a multifunction peripheral). The input device 10 is used for operations for inputting characters, designating a destination, and inputting various instructions to devices. The characters include, for example, hiragana, katakana, kanji, alphabets, other phonographic and ideographic characters, numbers, and marks (such as an at mark).

The receiving section 30 is configured to receive a plurality of characters input by an operation of a user. Specifically, the receiving section 30 is configured to receive a plurality of characters input by the user or a signal representing a plurality of characters received via a communication line and output them to the display control section 20. The plurality of characters contain, for example, a user name, a destination name, a destination address, an URL, a telephone number, and a folder name.

The confirming section 32 is configured to allow the display control section 20 to confirm the plurality of characters received by the receiving section 30. The confirming section 32 is, for example, an Enter key. In the receiving section 30, the plurality of received characters are in an edit standby state (for example, in a state where the user is manipulating the input of characters and therefore the input characters are still unconfirmed). For example, when the confirming section 32 is pressed down, the confirming section 32 outputs a confirmation signal for allowing the confirmation of the input to the display control section 20. When receiving the confirmation signal, the display control section 20 confirms the input of characters which is in an edit standby state.

The display section 34 is configured to display the plurality of confirmed characters. When the display control section 20 receives the confirmation signal from the confirming section 32, it allows the display section 34 to display the characters represented by the confirmation signal, i.e., the plurality of confirmed characters allowed to be confirmed by the confirming section 32, so that the user can view them. The display section 34 is, for example, a liquid crystal panel.

The touch sensor 36 is configured to detect a user's touch point on the display section 34. Specifically, the touch sensor 36 is configured to, when the user taps a finger or a pen on the display section 34, detect the touch point and output a signal representing the touch point to the display control section 20.

When the user double-taps on the display section 34, the display control section 20 identifies, based on the signal representing the touch point output by the touch sensor 36, at least one conversion target character from among a plurality of confirmed characters, converts the character style of the identified conversion target character, and allows the display section 34 to display the conversion target character in the converted character style. The term "double tap" means a user's action of tapping twice at substantially the same point on the display section 34 in a certain period of time. The term "conversion target character" means, among a plurality of confirmed characters displayed on the display section 34, an arbitrary confirmed character which the display control section 20 identifies as a target character for converting its character style based on the touch point where the user has double-tapped.

In Embodiment 1, when the user double-taps on a display region of an arbitrary confirmed character displayed on the display screen of the display section 34, the touch sensor 36 detects the touch point on the display screen of the display section 34 where the double tap has been given. The display control section 20 identifies, based on the touch point, at least one conversion target character from among a plurality of confirmed characters and converts the character style of the identified conversion target character. Therefore, even after the edit state of a plurality of input or displayed characters has been confirmed, the user can easily convert the character style of any of the plurality of confirmed characters with a double tap on the display, without taking the time and effort to designate the position of the conversion target character and re-enter a correct character.

Details 1 of Character Style Conversion Operation

With reference to FIGS. 1 and 2A to 2E, a description will be given of details of a character style conversion operation through a double tap. FIGS. 2A to 2E are schematic views showing a character style conversion process. The operation is performed in the following order: FIGS. 2A, 2B, 2C, 2D, and 2E. With reference to FIGS. 2A to 2E, a description will be given of an example where the upper case of an alphabetic character is converted into the lower case and an example where the lower case is converted into the upper case.

Figure 2A:
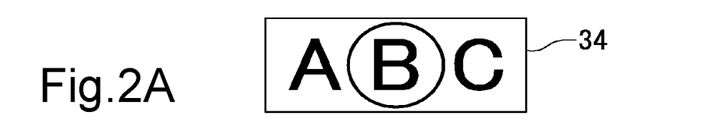
FIGS. 2A, 2B, 2C, 2D, and 2E are schematic views showing a character style conversion process according to one embodiment of the present disclosure.

As shown in FIG. 2A, a plurality of confirmed characters are displayed on the display section 34. As an example of the plurality of confirmed characters, alphabetic characters "ABC" are displayed on the display section 34. In FIG. 2A, the solid line encircling an upper case character "B" schematically shows that the character the character style of which the user wants to convert (correct) is the upper case character "B".

Figure 2B:
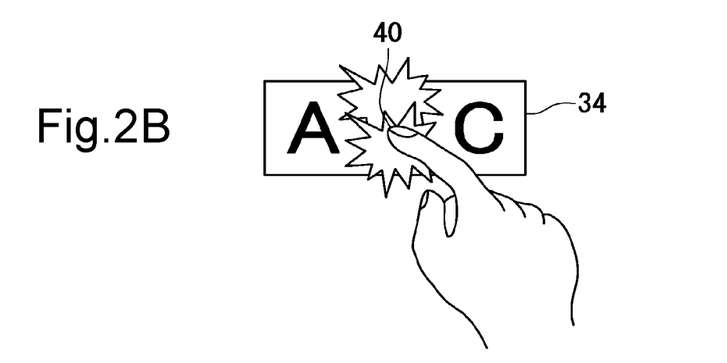

As shown in FIG. 2B, in order to convert the upper case character "B" of the plurality of confirmed characters "ABC" into the lower case character "b", the user double-taps a finger on the display screen of the display section 34. The double tapping can be done with a pen. When the user double-taps a finger directly on a display region of the upper case character "B" displayed on the display section 34, the touch sensor 36 detects a user's touch point 40 on the display section 34 and the display control section 20 identifies, among the plurality of confirmed characters, the upper case character "B" displayed at the touch point 40 as a conversion target character, converts the character style of the conversion target character "B" into the lower case character "b", and allows the display section 34 to display the conversion target character in the converted character style.

Figure 2C:
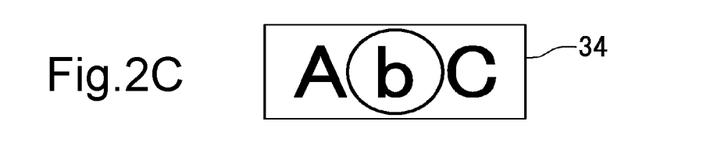

FIG. 2C shows a result of the character style conversion. As the result of the character style conversion, alphabetic characters "AbC" are displayed on the display section 34.

Figure 2D:
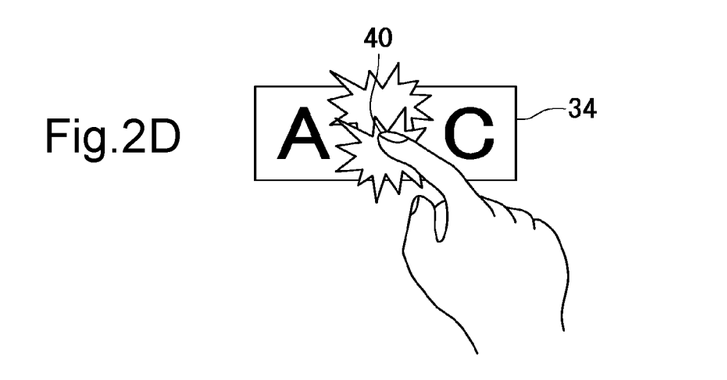

As shown in FIG. 2D, also when the lower case character "b" of the plurality of confirmed characters "AbC" is converted into the upper case character "B", the user double-taps a finger, like the operation shown in FIG. 2B. Specifically, when the user double-taps a finger on a display region of the lower case character "b" displayed on the display section 34, the touch sensor 36 detects a user's touch point 40 on the display section 34 and the display control section 20 identifies, among the plurality of confirmed characters, the lower case character "b" as a conversion target character, converts the character style of the conversion target character "b" into the upper case character "B", and allows the display section 34 to display the conversion target character in the converted style. In short, when the touch sensor 36 detects a double tap, the display control section 20 converts the character style of the conversion target character displayed at the touch point 40 created by the double tap into another convertible character style, such as from the upper case to the lower case or from the lower case to the upper case, and allows the display section 34 to display the conversion target character in the converted character style. The display control section 20 confirms the conversion target character converted in character style.

Figure 2E:
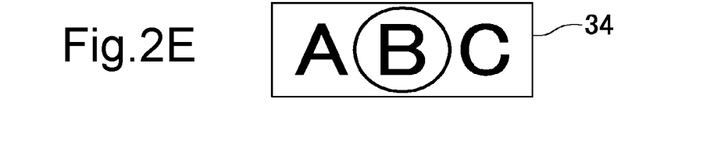

FIG. 2E shows a result of the character style conversion performed by the display control section 20. As the result of the character style conversion, alphabetic characters "ABC" are displayed on the display section 34.

As thus far described with reference to FIGS. 2A to 2E, the user can convert the character style of the upper case character "B" of the plurality of confirmed characters "ABC" into the lower case character "b" with just a double tap and can convert, likewise, the character style of the lower case character "b" into the upper case character "B". Therefore, the work for correcting the character style of a confirmed character is easy.

The above description gives an example where in the input device 10 of this embodiment the display control section 20 identifies a confirmed character displayed at a single point indicated by a touch point 40 as a conversion target character. When the user double-taps on a display region of an arbitrary confirmed character displayed on the display section 34, the touch sensor 36 detects a single point indicated by the touch point 40 on the display section 34. The display control section 20 identifies, based on the single touch point 40, a single conversion target character displayed at the single touch point 40 from among the plurality of confirmed characters, converts the character style of the conversion target character, and allows the display section 34 to display the conversion target character in the converted character style. Therefore, the user can, with a finger, easily specify the position of a single confirmed character to be converted in character style from among the plurality of confirmed characters and convert the character style of the conversion target character.

Pairs of character styles interconvertible by the display control section 20 include: for example, pairs of upper and lower case alphabetic characters (such as a pair of an upper case character "A" and a lower case character "a"), pairs of non-sutegana and sutegana characters (such as a pair of a non-sutegana character "つ" and a sutegana character "っ" and a pair of a non-sutegana character "や" and a sutegana character "ゃ"), pairs of double-byte and one-byte characters (such as a pair of a double-byte character "A" and a one-byte character "A", a pair of a double-byte katakana character "サ" and a one-byte katakana character "ｻ", a pair of a double-byte character "3" and a one-byte character "3", and a pair of a double-byte character "@" and a one-byte character "@"), pairs of hiragana and katakana characters (such as a pair of a hiragana character "あ" and a katakana character "ア"), and pairs of bold and standard characters (such as a pair of a bold character "B" and a standard character "B").

The term "sutegana" refers to a lower case character for use in describing a double consonant word, a contracted word or so on in the Japanese language and sutegana characters include, for example, a double consonant word "っ", contracted words "ゃ", "ゅ", "ょ", "ィ", and "ォ".

The character style conversion includes bidirectional conversion (for example, both of a conversion from an upper case character "A" to a lower case character "a" and a conversion from the lower case character "a" to the upper case character "A").

When the aforementioned character styles are included in convertible character styles, the user can easily correct the character styles of confirmed characters displayed for various purposes (for example, as a user name, a destination address or an URL) with a double tap.

Character Style Conversion Process

Figure 3:
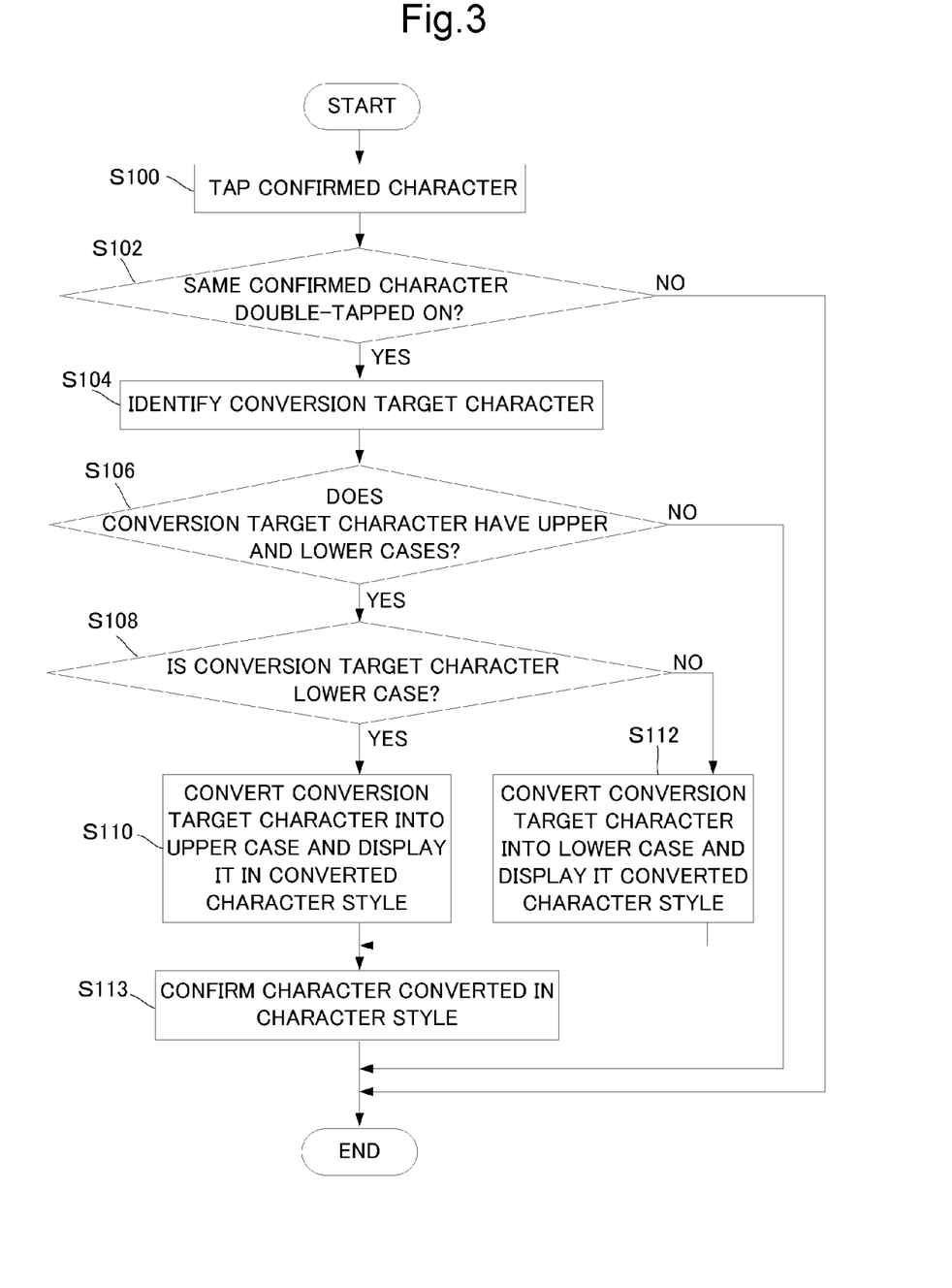
FIG. 3 is a flowchart showing the character style conversion process according to the one embodiment of the present disclosure.

With reference to FIGS. 1, 2A to 2E, and 3, a description will be given of a character style conversion process of the input device 10 in Embodiment 1 of the present disclosure. FIG. 3 is a flowchart showing the character style conversion process according to one embodiment of the present disclosure. As will be described with reference to FIG. 3, the character style of an already confirmed character is converted by executing Step S100 to Step S112. With reference to FIG. 3, a description will be given of an example where the upper case of an alphabetic character is converted into the lower case thereof.

Step 100: The user taps on a display region of an arbitrary confirmed character displayed on the display section 34. The touch sensor 36 detects a touch point 40 where the user has tapped. The display control section 20 receives a signal representing the touch point 40 output from the touch sensor 36.

Step S102: The display control section 20 determines, based on the signal representing the touch point 40 output from the touch sensor 36, whether or not a double tap has been done in the display region showing the same confirmed character. If the display control section 20 determines that the same confirmed character has been double-tapped on (Yes in Step S102), the conversion process proceeds to Step S104. If the display control section 20 determines that the same confirmed character has not been double-tapped on (No in Step S102), the display control section 20 ends the conversion process, so that the character style remains unconverted.

Step S104: The display control section 20 identifies a conversion target character. Specifically, the display control section 20 identifies as a conversion target character the confirmed character displayed on the touch point 40 where the double tap has been done.

Step S106: The display control section 20 determines whether or not the conversion target character has upper and lower cases as character styles. If the display control section 20 determines that the conversion target character has upper and lower cases as character styles (Yes in Step S106), the conversion process proceeds to Step S108. If the display control section 20 determines that the conversion target character does not have upper and lower cases as character styles (No in Step S106), the display control section 20 ends the conversion process, so that the character style remains unconverted.

Step S108: The display control section 20 determines whether or not the current character style of the conversion target character is the lower case. If the display control section 20 determines that the current character style of the conversion target character is the lower case (Yes in Step S108), the conversion process proceeds to Step S110. If the display control section 20 determines that the current character style of the conversion target character is not the lower case (No in Step S108), the conversion process proceeds to Step S112.

Step S110: The display control section 20 converts the character style of the conversion target character into the upper case and allows the display section 34 to display the conversion target character in the converted character style. Thus, the display control section 20 ends the character style conversion process.

Step S112: The display control section 20 converts the character style of the conversion target character into the lower case and allows the display section 34 to display the conversion target character in the converted character style. Thus, the display control section 20 ends the character style conversion process.

Step S113: The display control section 20 confirms the input of the conversion target character converted in character style in S110 or S112.

For example, in order to convert (correct) the character style of a character (letter) in a general input device, two operations are necessary which includes: designating the position of the character to be converted in character style through a tap with a pen or the like or by pressing of a cursor move key; and inputting with a pen a character in a correct character style on the character to be converted in character style. Therefore, it is difficult to correct the character style.

In contrast, the input device 10 according to this embodiment is configured to, in response to a user's double tap on any one of a plurality of confirmed characters displayed on the display section 34, identify a conversion target character to be converted in character style and convert the character style. As a result, even after the characters are confirmed, the time and effort taken for the user to specify a character to be converted in character style and input a character style as a conversion candidate can be reduced and the user can easily convert the character style of any one of a plurality of confirmed characters displayed on the display section.

Embodiment 2

Hereinafter, a description will be given of Embodiment 2 of the present disclosure with reference to FIGS. 1 and 4A to 4C. The same elements as those shown in FIGS. 1 and 2 will be designated by the same references and further explanation of common parts already described will be omitted or simplified.

In Embodiment 2, a description will be given of how the display control section 20 converts the character style when the touch sensor 36 concurrently detects two different touch points. This conversion corresponds to, for example, the conversion of the character style when the user double-taps two fingers concurrently at different points on the display screen of the display section 34.

Details 2 of Character Style Conversion Operation

Figure 4A:
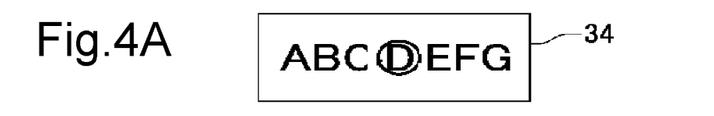
FIGS. 4A, 4B, and 4C are schematic views showing a character style conversion process according to another embodiment of the present disclosure.
Figure 4B:
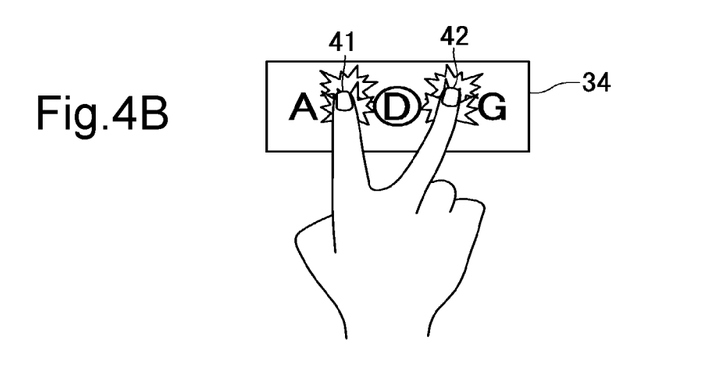
Figure 4C:
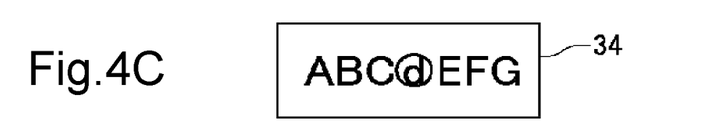

With reference to FIGS. 1 and 4A to 4C, a description will be given of details of an operation of converting a character style by giving a double tap concurrently with two fingers. FIGS. 4A to 4C are schematic views showing a character style conversion process. The operation is performed in the following order: FIGS. 4A, 4B, and 4C. With reference to FIGS. 4A to 4C, a description will be given of an example where the upper case of an alphabetic character is converted into the lower case.

As shown in FIG. 4A, a plurality of confirmed characters are displayed on the display section 34. As an example of the plurality of confirmed characters, alphabetic characters "ABCDEFG" are displayed on the display section 34. In FIG. 4A, the solid line encircling an upper case character "D" schematically shows that the character the character style of which the user wants to convert (correct) is the upper case character "D".

FIG. 4B shows double tapping performed to convert the character style of the upper case character "D" of the plurality of confirmed characters "ABCDEFG" into a lower case character "d". The user gives a double tap concurrently with two fingers so that the upper case character "D" displayed on the display section 34 is located at the midpoint of a line segment connecting two touch points 41, 42 with the two fingers. The touch sensor 36 concurrently detects the two different touch points 41, 42 and outputs respective signals representing the touch points to the display control section 20. In this case, the display control section 20 identifies, among the plurality of confirmed characters, an upper case character "D" displayed on the midpoint of the line segment connecting the touch point 41 and the touch point 42 as a conversion target character, converts the character style of the identified conversion target character "D" into a lower case character "d", and allows the display section 34 to display the conversion target character in the converted character style. The display control section 20 confirms the input of the conversion target character converted in character style.

FIG. 4C shows a result of the character style conversion performed by the display control section 20. As the result of the character style conversion, alphabetic characters "ABCdEFG" are displayed on the display section 34.

As thus far described with reference to FIGS. 1 and 4A to 4C, in Embodiment 2, the display control section 20 identifies, based on two different touch points (i.e., a touch point 41 and a touch point 42) concurrently detected by the touch sensor 36, a confirmed character displayed on the midpoint of a line segment connecting the two different touch points 41, 42 as a conversion target character. Therefore, even if the size of the confirmed characters displayed on the display section 34 is small, the user can, with two fingers, easily specify the position of a confirmed character to be converted in character style and convert the character style of the conversion target character. Hence, the user can easily convert the style of the character regardless of the size of the character.

Embodiment 3

Hereinafter, a description will be given of Embodiment 3 of the present disclosure with reference to FIGS. 1 and 5A to 5C. The same elements as those shown in FIGS. 1 and 2 will be designated by the same references and further explanation of common parts already described will be omitted or simplified.

In this embodiment, a description will be given of how the display control section 20 converts the character style of a plurality of characters when the touch sensor 36 concurrently detects two different touch points. This conversion corresponds to, for example, the conversion of the character style when the user double-taps two fingers concurrently at different points on the display screen of the display section 34. As seen from below, this embodiment is different from Embodiments 1 and 2 in that the display control section 20 identifies a plurality of confirmed characters displayed on a line segment connecting two different touch points as conversion target characters.

Details 3 of Character Style Conversion Operation

Figure 5A:
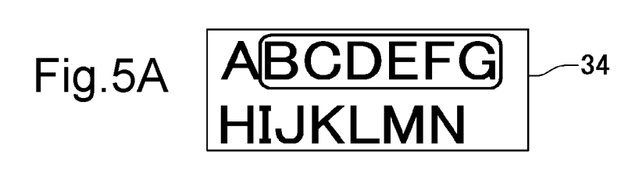
FIGS. 5A, 5B, and 5C are schematic views showing a character style conversion process according to still another embodiment of the present disclosure.
Figure 5B:
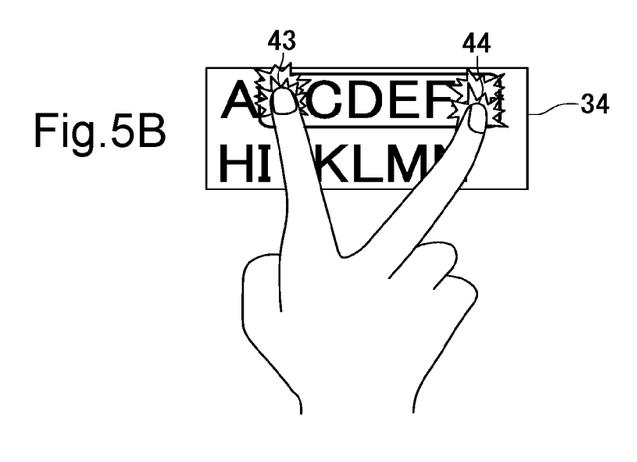
Figure 5C:
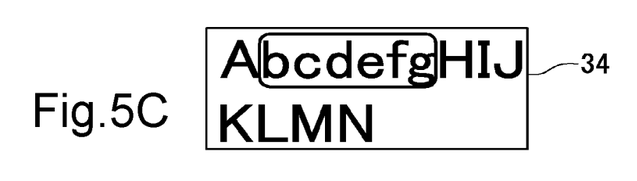

With reference to FIGS. 1 and 5A to 5C, a description will be given of details of an operation of converting a character style by giving a double tap concurrently with two fingers. FIGS. 5A to 5C are schematic views showing a character style conversion process. The operation is performed in the following order: FIGS. 5A, 5B, and 5C. With reference to FIGS. 5A to 5C, a description will be given of an example where the upper case of alphabetic characters is converted into the lower case.

As shown in FIG. 5A, a plurality of confirmed characters are displayed on the display section 34 by the display control section 20. As an example of the plurality of confirmed characters, alphabetic characters "ABCDEFGHIJKLMN" are displayed on the display section 34. In FIG. 5A, the solid line encircling the upper case characters "BCDEFG" schematically shows that the characters the style of which the user wants to convert (correct) are the upper case characters "BCDEFG".

FIG. 5B shows double tapping performed to convert the character style of the upper case characters "BCDEFG" of the plurality of confirmed characters "ABCDEFGHIJKLMN" into a plurality of lower case characters "bcdefg". The user gives a double tap concurrently with two fingers so that the plurality of upper case characters "BCDEFG" displayed on the display section 34 are located on a line segment connecting two touch points 43, 44 with the two fingers. The touch sensor 36 concurrently detects the two different touch points 43, 44 and outputs signals representing the touch points to the display control section 20. In this case, the display control section 20 identifies, among the plurality of confirmed characters, a plurality of upper case characters "BCDEFG" displayed on the line segment connecting the touch point 43 and the touch point 44 as conversion target characters, converts the character style of the identified conversion target characters into a plurality of lower case characters "bcdefg", and allows the display section 34 to display the conversion target characters in the converted character style. The display control section 20 confirms the input of the conversion target characters converted in character style.

FIG. 5C shows a result of the character style conversion performed by the display control section 20. As the result of the style conversion, alphabetic characters "AbcdefgHIJKLMN" are displayed on the display section 34.

As thus far described with reference to FIGS. 1 and 5A to 5C, in Embodiment 3, the display control section 20 identifies, based on two different touch points 43, 44 concurrently detected by the touch sensor 36, a plurality of confirmed characters displayed on a line segment connecting the two different touch points 43, 44 as conversion target characters. Therefore, even if, among a plurality of confirmed characters displayed on the display section 34, the target which the user wants to convert in terms of character style is a character sequence consisting of a plurality of confirmed characters, the character style of the sequence of conversion target characters can be converted at a time through a user's double tap with two fingers. Hence, the user can easily convert the character style of the character sequence regardless of the length of the character sequence to be converted in character style.

Embodiment 4

Hereinafter, a description will be given of Embodiment 4 of the present disclosure with reference to FIGS. 1 and 6A to 6C. The same elements as those shown in FIGS. 1 and 2 will be designated by the same references and further explanation of common parts already described will be omitted or simplified.

In this embodiment, a description will be given of how the display control section 20 converts the character style of a plurality of characters when the touch sensor 36 concurrently detects two different touch points. This conversion corresponds to, for example, the conversion of the character style when the user double-taps two fingers concurrently on the display section 34. As seen from below, this embodiment is different from Embodiments 1, 2, and 3 in that the display control section 20 identifies a plurality of confirmed characters displayed in a rectangular region having two different touch points located at opposite diagonal corners as conversion target characters.

Details 4 of Character Style Conversion Operation

Figure 6A:
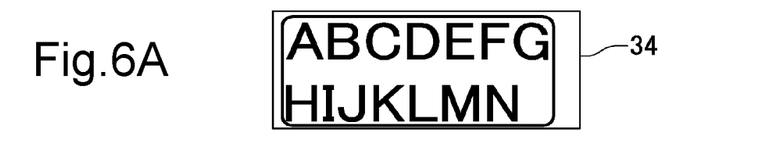
FIGS. 6A, 6B, and 6C are schematic views showing a character style conversion process according to still another embodiment of the present disclosure.
Figure 6B:
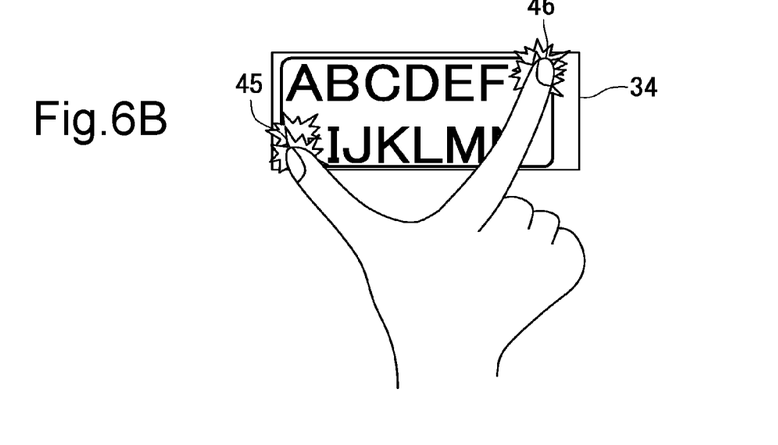
Figure 6C:
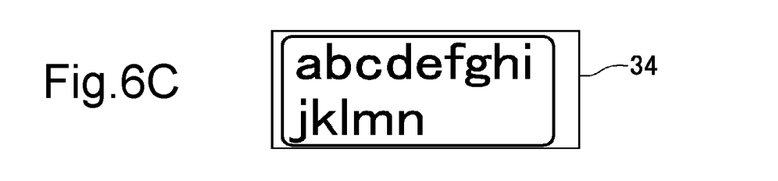

With reference to FIGS. 1 and 6A to 6C, a description will be given of details of an operation of converting a character style by giving a double tap concurrently with two fingers. FIGS. 6A to 6C are schematic views showing a character style conversion process. The operation is performed in the following order: FIGS. 6A, 6B, and 6C. With reference to FIGS. 6A to 6C, a description will be given of an example where the upper case of alphabetic characters is converted into the lower case.

As shown in FIG. 6A, a plurality of confirmed characters are displayed in a plurality of lines on the display section 34 (or the plurality of confirmed characters may be displayed in a single line). As an example of the plurality of confirmed characters, alphabetic characters "ABCDEFGHIJKLMN" are displayed on the display section 34 by the display control section 20. In FIG. 6A, the solid line encircling a plurality of upper case characters "ABCDEFGHIJKLMN" schematically shows that the characters the style of which the user wants to convert (correct) are the plurality of upper case characters "ABCDEFGHIJKLMN".

FIG. 6B shows double tapping performed to convert the character style of the upper case characters "ABCDEFGHIJKLMN" of the plurality of confirmed characters "ABCDEFGHIJKLMN" into a plurality of lower case characters "abcdefghijklmn". The user positions two fingers on respective touch points 45, 46 on the display screen of the display section 34 and double-taps concurrently at the touch points 45, 46 so that the plurality of upper case characters "ABCDEFGHIJKLMN" displayed on the display section 34 are located in a rectangular region having the touch points 45, 46 located at opposite diagonal corners. In this case, part of the plurality of upper case characters "ABCDEFGHIJKLMN" may be located on the frame of the rectangular region. In other words, part of the plurality of upper case characters "ABCDEFGHIJKLMN" may be out of the rectangular region. The touch sensor 36 concurrently detects the two different touch points 45, 46 and outputs signals representing the touch points to the display control section 20. The display control section 20 identifies, among the plurality of confirmed characters, the plurality of upper case characters "ABCDEFGHIJKLMN" displayed in the rectangular region having the touch point 45 and the touch point 46 located at opposite diagonal corners as conversion target characters and converts the character style of the identified conversion target characters into the plurality of lower case characters "abcdefghijklmn. The display control section 20 confirms the input of the conversion target characters converted in character style.

FIG. 6C shows a result of the character style conversion performed by the display control section 20. As the result of the character style conversion, alphabetic characters "abcdefghijklmn" are displayed on the display section 34.

As thus far described with reference to FIGS. 1 and 6A to 6C, in Embodiment 4, the display control section 20 identifies, based on two different touch points 45, 46 concurrently detected by the touch sensor 36, a plurality of confirmed characters displayed in a rectangular region having the two different touch points 45, 46 located at opposite diagonal corners as conversion target characters. Therefore, even if, among a plurality of confirmed characters displayed on the display section 34, the target which the user wants to convert in terms of character style is a character sequence consisting of a plurality of confirmed characters or a plurality of lines of character sequences consisting of a plurality of confirmed characters, the character style of the sequence or sequences of conversion target characters can be converted at a time through a user's double tap with two fingers. Hence, the user can easily convert the character style of the character sequence or sequences within a specified range regardless of the length and number of lines of character sequences to be converted in character style.

Embodiment 5

Hereinafter, a description will be given of Embodiment 5 of the present disclosure with reference to FIGS. 1 and 7A to 7C. The same elements as those shown in FIGS. 1, 2, and 5 will be designated by the same references and further explanation of common parts already described will be omitted or simplified.

Determination of Presence or Absence of Conversion Target Character Convertible in Character Style In this embodiment, a description will be given of a method in which when the touch sensor 36 detects a touch point, the display control section 20 performs a character style conversion process shown in any one of Embodiments 1 to 4 and determines whether or not one or a plurality of conversion target characters contain at least one conversion target character convertible in character style.

Figure 7A:
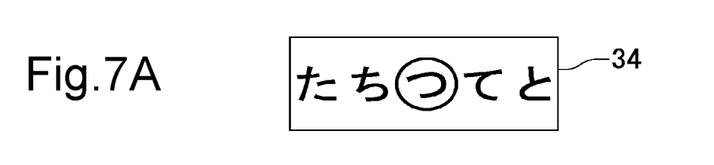
FIGS. 7A, 7B, and 7C are schematic views showing a character style conversion process according to still another embodiment of the present disclosure.
Figure 7B:
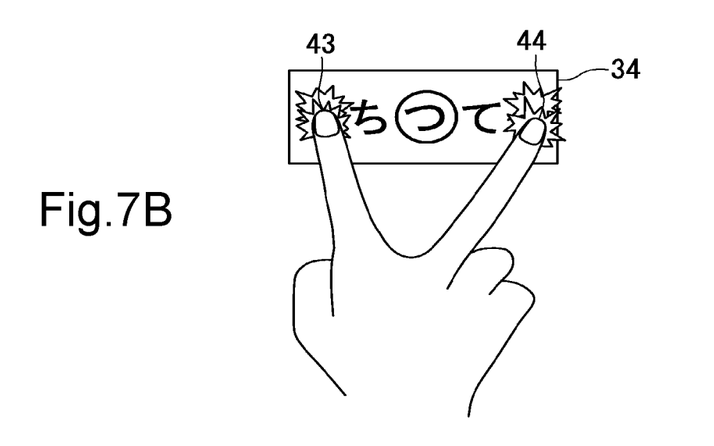
Figure 7C:
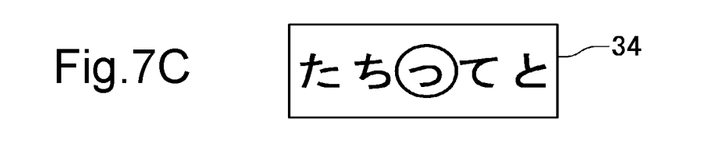

With reference to FIGS. 1 and 7A to 7C, a description will be given of a method for determining, when a plurality of conversion target characters are specified by a double tap with concurrent use of two fingers, whether any conversion target character convertible in character style is present or absent. FIG. 7 shows as an example the case where, as shown in Embodiment 3, a plurality of confirmed characters displayed on a line segment connecting two different touch points are identified as conversion target characters. FIGS. 7A to 7C are schematic views showing a character style conversion process. The operation is performed in the following order: FIGS. 7A, 7B, and 7C. With reference to FIGS. 7A to 7C, a description will be given of a method for determining whether or not a sequence of hiragana characters contains any character convertible in character style.

As shown in FIG. 7A, a plurality of confirmed characters are displayed on the display section 34. As an example of the plurality of confirmed characters, hiragana characters "たちつてと" are displayed on the display section 34. In this case, only a character "つ" is a character convertible in character style. In FIG. 7A, the solid line encircling a hiragana character "つ" schematically shows that, among hiragana characters "たちつてと", only the character "つ" is a character convertible in character style.

In specifying a plurality of confirmed characters "たちつてと" as conversion target characters, the user gives a double tap concurrently with two fingers so that the plurality of confirmed characters "たちつてと" displayed on the display section 34 are located on a line segment connecting two touch points 43, 44 with the two fingers. FIG. 7B shows double tapping performed to specify the plurality of confirmed characters "たち つてと" as conversion target characters. The touch sensor 36 concurrently detects the two different touch points 43, 44 and outputs signals representing the touch points to the display control section 20. The display control section 20 identifies, among the plurality of confirmed characters, the plurality of confirmed characters "たちつてと" displayed on the line segment connecting the touch point 43 and the touch point 44 as conversion target characters. The display control section 20 determines whether or not any conversion target character convertible in character style is present among the conversion target characters "たちつてと". In this case, the display control section 20 determines that, among the conversion target characters "たちつてと", only "つ" is a conversion target character convertible in character style. The display control section 20 converts, based on the above determination information, the character style of the non-sutegana character "つ" into a sutegana character "っ" and allows the display section 34 to display the sutegana character. In other words, the display control section 20 converts the character style of the conversion target character determined to be convertible in character style into another convertible character style and allows the display section 34 to display the conversion target character in the converted character style. The display control section 20 confirms the input of the conversion target character converted in character style. If no character convertible in character style is present among the conversion target characters, the display control section 20 ends the process without converting the character style of any conversion target character.

FIG. 7C shows a result of the character style conversion. As the result of the character style conversion, hiragana characters "たちっては" are displayed on the display section 34.

As thus far described with reference to FIGS. 1 and 7A to 7C, in Embodiment 5, the display control section 20 determines whether or not at least one conversion target character convertible in character style is present among conversion target characters and, when determining that at least one conversion target character convertible in character style is present, converts the character style of the conversion target character convertible in character style. Therefore, without taking the time and effort to select and specify only at least one confirmed character convertible in character style from among a plurality of confirmed characters displayed on the display section, the user can easily, with a double tap, convert the character style of the confirmed character convertible in character style. Although in FIGS. 7A to 7C the case of Embodiment 3 has been described as an example, the determination method of this embodiment is applicable to Embodiments 1, 2, and 4.

Embodiment 6

Priorities Among Various Character Style Conversions

Furthermore, in the input device 10 described with reference to FIGS. 1 to 7, the user can previously set the display control section 20 to assign priorities to character styles into which the user wants to convert a conversion target character. For example, the character style of a double-byte, upper-case alphabetic character "A" can be generally converted into either a double-byte, lower-case alphabetic character "a" or a one-byte, upper-case alphabetic character "A". For example, the user can previously set the display control section 20 to assign priorities to types of character style conversion in the following order: (1) conversion from the upper-case to lower-case character and vice versa; and (2) conversion from the double-byte to one-byte character and vice versa. Thereafter, when the user double-taps on the double-byte, upper-case character "A" displayed as a confirmed character on the display section 34, the display control section 20 determines into which character style the conversion target character "A" should be converted based on the previously assigned priorities. In this case, the display control section 20 converts, according to the above assigned priorities, the conversion target character "A" not into the one-byte, upper-case character "A" but into the double-byte, lower-case character "a" and allows the display section 34 to display the conversion target character in the converted character style. The display control section 20 confirms the input of the conversion target character converted in character style.

The priorities to types of character style conversion may be previously assigned, depending upon the purpose of the user, among conversion from one character style to the other shown in Embodiment 1, i.e., conversion from upper-case to lower-case alphabetic character and vice versa, conversion from non-sutegana to sutegana character and vice versa, conversion from double-byte to one-byte character and vice versa, conversion from hiragana to katakana character and vice versa, and conversion from bold to standard character and vice versa.

As thus far described, in the input device 10 of Embodiment 6, the display control section 20 converts the character style according to priorities previously assigned by the user. Therefore, the user can convert, easily at any time, a target character into a frequently-used character style very likely to be converted into by previously setting the frequently-used character style in the input device 10.

Embodiment 7

Electronic Apparatus

Figure 8:
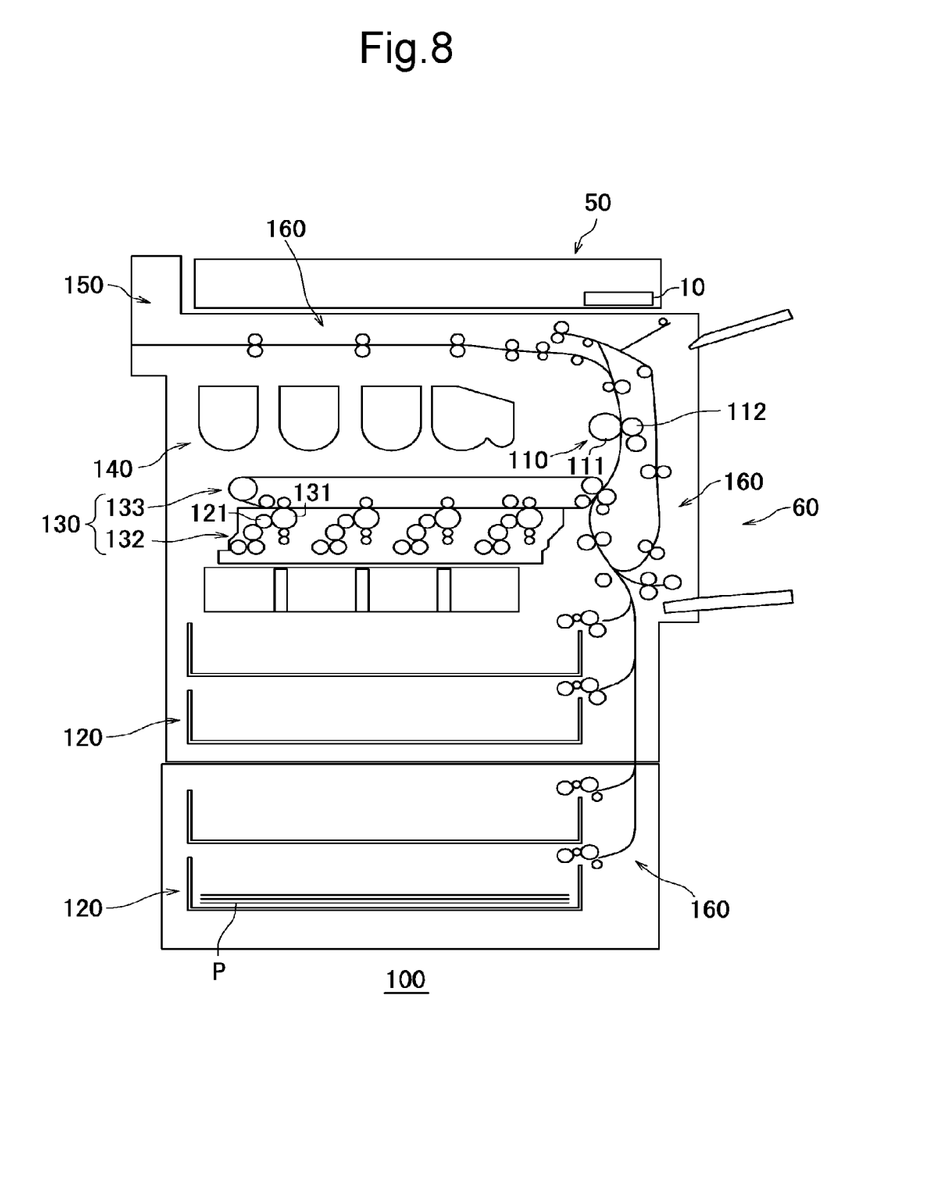
FIG. 8 is a schematic view showing an image forming apparatus according to Embodiment 7 of the present disclosure.

With reference to FIG. 8, a description will be given of an image forming apparatus as an example of an electronic apparatus according to the present disclosure. FIG. 8 is a schematic view showing an image forming apparatus 100 according to an embodiment of the present disclosure. The image forming apparatus 100 can be, for example, a copier, a printer, a facsimile machine or a multifunction peripheral having some or all of these functions.

The image forming apparatus 100 includes an input device 10, an image reading section 50, and an image forming section 60. The image forming section 60 includes a fixing device 110, a plurality of paper feed cassettes 120, an imaging section 130, a plurality of toner supply devices 140, a sheet discharge section 150, and a sheet conveyance section 160. The image forming apparatus 100 operates based on information input through the input device 10. For example, the image forming apparatus 100 transmits data read by the image reading section 50 to a mail address input through the input device 10. The image forming section 60 forms an image based on image data read by the image reading section 50.

Each of the paper feed cassette 120 can accommodate paper sheets P for printing. In printing, a paper sheet P in the paper feed cassette 120 is conveyed by the sheet conveyance section 160 so that it passes through the imaging section 130 and the fixing device 110 and is then discharged through the sheet discharge section 150.

In the imaging section 130, a toner image is formed on the paper sheet P. The imaging section 130 includes a plurality of photoconductors 131, a plurality of developing devices 132, and a transfer device 133.

For example, an electrostatic latent image is formed on each of the photoconductors 131 by laser based on an electronic signal corresponding to an image of an original document generated by the image reading section 50. Each of the developing devices 132 includes a developing roller 121. The developing roller 121 supplies toner to the associated photoconductor 131 to develop an electrostatic latent image on the photoconductor 131 and thus form a toner image thereon. The toner is supplied from the associated toner supply device 140 to the associated developing device 132.

The transfer device 133 is configured to transfer the toner images formed on the photoconductors 131 to the paper sheet P.

In the fixing device 110, heat and pressure are applied to the paper sheet P by a fixing member 111 and a pressure member 112, so that the unfixed toner image formed on the imaging section 130 is melted and fixed on the paper sheet P.

Although a description has been given of the electronic apparatus including the input device 10 by using as an example the image forming apparatus 100 with reference to FIG. 8, the electronic apparatus including the input device 10 is not limited to the image forming apparatus 100. For example, the electronic apparatus including the input device 10 may be a smartphone or a tablet.

INDUSTRIAL APPLICABILITY

The input device according to the present disclosure can be suitably used in an image forming apparatus and an electronic apparatus which include a touch panel.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An input device comprising:
    a receiving section configured to receive a plurality of characters input by an operation of a user;
    a confirming section allowing the plurality of characters received by the receiving section to be confirmed;
    a display section configured to display the plurality of characters allowed to be confirmed by the confirming section;
    a touch sensor configured to detect a touch point on the display section; and
    a display control section configured to confirm the plurality of characters according to a confirmation signal received from the confirming section and allow the display section to display the plurality of confirmed characters,
    wherein the display control section is further configured to identify, based on the touch point detected by the touch sensor through a double tap of the user, at least one conversion target character from among the plurality of confirmed characters, determine whether or not any conversion target character convertible in character style is present in the conversion target characters, convert a character style of the conversion target character convertible in character style in a case where the conversion target character convertible in character style is present, allow the display section to display the conversion target character in the converted character style, confirm the conversion target character in the converted character style.

2. The input device according to claim 1, wherein the display control section is configured to convert the character style of the conversion target character convertible in character style from an upper case to a lower case and vice versa.

3. The input device according to claim 1, wherein the display control section is configured to identify the confirmed character displayed at a single point indicated by the touch point as the conversion target character.

4. The input device according to claim 1, wherein the display control section is configured to identify, based on two different touch points concurrently detected by the touch sensor, the confirmed character displayed on a midpoint of a line segment connecting the two different touch points as the conversion target character.

5. The input device according to claim 1, wherein the display control section is configured to identify, based on two different touch points concurrently detected by the touch sensor, a plurality of the confirmed characters displayed on a line segment connecting the two different touch points as the conversion target characters.

6. The input device according to claim 1, wherein the display control section is configured to identify, based on two different touch points concurrently detected by the touch sensor, a plurality of the confirmed characters displayed in a rectangular region having the two different touch points located at opposite diagonal corners as the conversion target characters.

7. The input device according to claim 1, wherein the display control section is previously set by the user to assign priorities to character styles to be converted into and is configured to, when the conversion target character convertible in character style having been determined to be convertible in character style has a plurality of convertible character styles, convert the character style of the conversion target character into a higher-priority character style according to the priorities.

8. The input device according to claim 7, wherein character style of the conversion target character convertible in character style is convertible for both of a conversion between an upper case and a lower case, and a conversion between a double-byte character and a one-byte character, and for the priority assignment, which one of the conversions, the conversion between an upper case and a lower case or the conversion between a double-byte character and a one-byte character, is to be given priority in character style is set.

9. The input device according to claim 1, wherein the display control section is configured to convert the character style of the conversion target character convertible in character style from a non-sutegana character to a sutegana character and vice versa, or from a double-byte character to a one-byte character and vice versa.

10. An image forming apparatus comprising an input device, wherein the input device comprising:
a receiving section configured to receive a plurality of characters input by an operation of a user;
a confirming section allowing the plurality of characters received by the receiving section to be confirmed;
a display section configured to display the plurality of characters allowed to be confirmed by the confirming section;
a touch sensor configured to detect a touch point on the display section; and
a display control section configured to confirm the plurality of characters according to a confirmation signal received from the confirming section and allow the display section to display the plurality of confirmed characters,
wherein the display control section is further configured to identify, based on the touch point detected by the touch sensor through a double tap of the user, at least one conversion target character from among the plurality of confirmed characters, determines whether or not any conversion target character convertible in character style is present in the conversion target characters, convert a character style of the conversion target character convertible in character style in a case where the conversion target character convertible in character style is present, allow the display section to display the conversion target character in the converted character style, confirm the conversion target character in the converted character style.

11. An electronic apparatus comprising an input device,
wherein the input device comprising:
a receiving section configured to receive a plurality of characters input by an operation of a user;
a confirming section allowing the plurality of characters received by the receiving section to be confirmed;
a display section configured to display the plurality of characters allowed to be confirmed by the confirming section;
a touch sensor configured to detect a touch point on the display section; and
a display control section configured to confirm the plurality of characters according to a confirmation signal received from the confirming section and allow the display section to display the plurality of confirmed characters,
wherein the display control section is further configured to identify, based on the touch point detected by the touch sensor through a double tap of the user, at least one conversion target character from among the plurality of confirmed characters, determines whether or not any conversion target character convertible in character style is present in the conversion target characters, convert a character style of the conversion target character convertible in character style in a case where the conversion target character convertible in character style is present, allow the display section to display the conversion target character in the converted character style, confirm the conversion target character in the converted character style.

* * * * *